Patented June 27, 1933

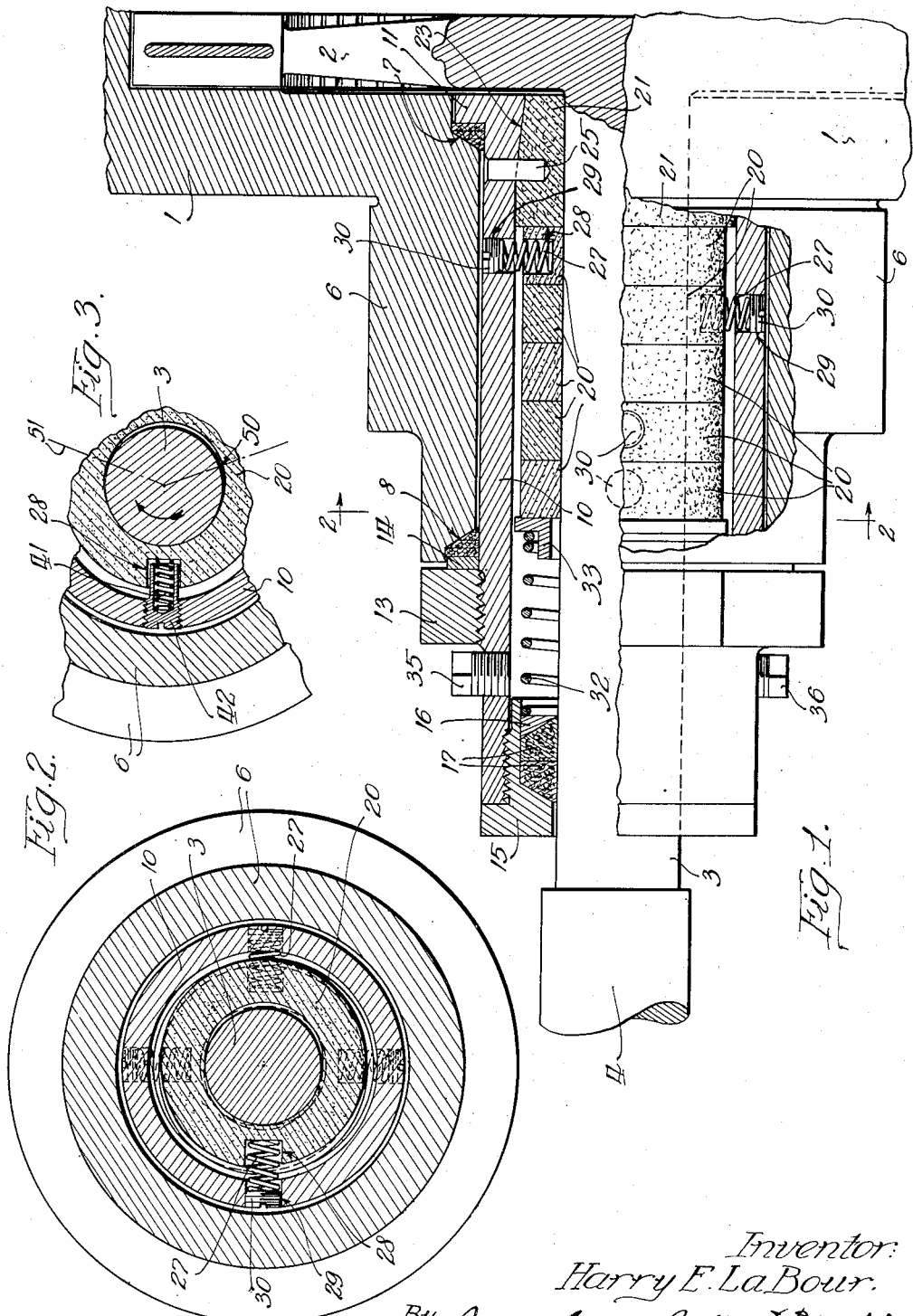

1,915,677

UNITED STATES PATENT OFFICE

HARRY E. LA BOUR, OF ELKHART, INDIANA

APPARATUS FOR PACKING SHAFTS

Application filed February 24, 1930. Serial No. 430,483.

My invention relates to packing glands and is particularly adapted to forming a fluid tight joint for a shaft or rod where corrosive fluid is pumped, or for general purposes.

While I shall herein describe and illustrate a packing gland for packing a rotary shaft particularly adapted for use in handling corrosive fluid, it is to be understood that the invention is not to be limited to this particular service or the specific structure which I have herein described and illustrated. It may, for example be employed in connection with reciprocating shafts or rods.

In the handling of corrosive fluids it is difficult to keep a tight packing gland because the fluid attacks the packing, in some cases destroying its lubricating qualities, and in some cases destroying its structure, thereby causing disintegration and the like.

I propose to employ carbon rings or rings of any other equivalent corrosion resisting material preferably having the ability not only to resist corrosion but also to provide antifriction qualities. These rings are so arranged in their mounting that the gland may have some degree of flexibility or freedom of movement in order to follow the eccentricity of the shaft. I propose, however, to so limit this flexibility or freedom of movement that the gland or a part thereof is sufficiently rigid to steady the shaft and prevent whipping thereof when it is revolved at high speed.

Another object of my invention is to provide a packing of such a character that the parts thereof may be assembled before being mounted in the machine, then when it is complete it can be inserted as a complete assembly. This facilitates correct assembly as it can be performed on a bench where it is less awkward and for the same reason increases accuracy.

There is also the possibility that due to assembly variations or machine variations the shaft may not be absolutely concentric with the packing gland housing, and it is therefore another object of my invention to provide a complete unit which will assemble true to the shaft and when drawn tight will adjust itself to any misalignment between the shaft and the housing. While I show the end faces as disposed in planes they may for example be substantially spherical to permit of angular adjustment.

I also propose to provide connections to supply grease or other lubricant to the gland.

Other objects and advantages of my invention will be apparent to those skilled in the art after a consideration of the following detailed description of one embodiment thereof which is illustrated in the accompanying drawing in which:

Figure 1 is a longitudinal section through the packing gland and the housing therefor;

Figure 2 is a cross-section taken substantially on the line 2—2 of Figure 1; and Figure 3 is a fragmentary sectional view showing one modification of the resilient mounting of the packing rings.

In the embodiment chosen to illustrate my invention, the numeral 1 indicates a portion of a pump housing and to indicate the impeller of the pump, which in this case is adapted for use in pumping chemicals and other corrosive liquids. While it is in such use that my invention has its greatest utility, it is obvious that it may be used under many and various other conditions.

The impeller 2 is preferably cast integral with a stub shaft 3, the impeller and stub shaft being made of acid resisting metal. The stub shaft 3 in turn, is rigidly secured to the shaft 4 preferably by a telescopic joint and axial bolt. The shaft 4 is carried or driven by the prime mover such as an electric motor or the like.

The gland housing 6 is shown as integral with the pump housing 1 and is provided at 7 and 8 with annular recesses at the inner and outer ends respectively. These recesses are adapted for the reception of packing material of any suitable type whereby the shaft packing assembly can be secured to the housing in such a manner as to obviate leakage between the shaft packing assembly and the gland housing. The packing in recesses 7 and 8 is preferably asbestos fiber packing providing a relatively yielding seat but as the packing is not subjected to wear it will stand up for a long time.

The shaft packing assembly, referred to above, is seen to comprise the sleeve 10 which is provided with a flange 11 at its inner end and which is adapted to be seated against the packing in the recess 7. Near the other end of the sleeve 10, which end is reduced as shown in Figure 1, exterior screw threads are provided to receive the gland nut 13. The gland nut 13 is adapted to be screwed against the metal washer or ring 14 so as to compress the packing in the recesses 7 and 8. In this manner the sleeve 10 is secured to the gland housing 6 so as to provide a leak proof joint which has a certain degree of yield and may also be readily uncoupled.

The outer reduced end of the sleeve 10 is provided with interior threads which receive the recessed plug 15. Between the recessed plug 15 and the packing ring follower 16 fibrous packing 17 of any suitable type or material, for example asbestos fiber, is adapted to be compressed against the stub shaft 3.

Mounted within the sleeve 10 are a number of carbon rings 20 or packing elements which are adapted to encircle the shaft 3 and to fit closely thereto. These rings 20 are of smaller diameter than the internal diameter of the sleeve 10 so that there may be clearance between these rings 20 and the sleeve 10, particularly for the purpose of providing freedom of movement of the rings in case of slight eccentricity of the shaft and also for permitting the rings to shift laterally as they wear.

The packing ring 21 while preferably of the same material as the packing rings 20 is of different form. The inner end of the sleeve 10 is provided with a reducing taper 23 and the ring 21 is tapered also to fit closely within the taper 23. In order to prevent leakage between the sleeve 10 and the ring 21 the latter is sealed or cemented in place, and the ring 21 after being seated in the taper and sealed may also be further held in place by means of one or more pins 25. These pins 25 effectively prevent the pressure inside of the pump from driving the ring 21 back on the taper and so loosening it and permitting leakage between the sleeve and the ring 21.

Each of the rings 20 is provided with a spring 27 for applying pressure to one side of the ring, and each of these springs 27 projects into a bore or recess 28 formed in one side of the corresponding ring 20. The sleeve 10 is also provided with a number of threaded openings 29 which receive the screw plugs 30.

The screw plugs 30 bear against the outer ends of the springs 27, as is clear from Figure 1, and hold the springs under the predetermined degree of tension.

While the packing rings 20 fit the shaft 3 closely, it is obvious that some clearance exists and that in use some wear will take place, particularly in line with the springs 29. After a period of use, therefore, each of the rings 20 will contact with only one half of the circumference of the shaft, the side of the rings opposite the spring 27 being spaced from the other half of the circumference of the shaft, as shown in an exaggerated form in Figures 2 and 3. Hence the rings will always bear closely upon one half of the circumference of the shaft.

It is noted from Figure 1 that the ring 20 adjacent the ring 21 is so positioned that its spring 27 acts downwardly to press the ring 20 against the upper half of the circumference of the shaft 3. The ring 20 adjacent the last mentioned ring is so positioned that its spring 27 acts upwardly so that this ring is pressed against the lower half of the circumference of the shaft 3. In other words, the springs just mentioned are at 180° to each other. The central one of the rings 20 is not provided with a spring and it is intended that this ring shall drift with the movement of the shaft 3 and is for the purpose of distributing any leakage which might get by the two innermost rings 20.

The outer pair of rings 20 are each provided with a spring such as the one shown in connection with the two innermost packing rings 20, the only exception being that these two rings have their springs arranged to press one of the rings toward one side of the shaft 3 and the other of the rings toward the other side of the shaft 3. In other words, these springs, while being at 180° to each other are 90° with respect to the first mentioned pair of springs 27.

A spring 32 is arranged to act between the packing ring 16 and the metal guide ring 33 and is for the purpose of pressing the rings 20 against one another longitudinally of the shaft 3 and at the same time compressing the packing 17. Thus the faces of the rings 20 are maintained in substantial contact.

The fundamental theory of this packing is that it is not pressure which is necessary to prevent leakage, but rather perfect surface fit. Thus when two of the rings 20 are held against the shaft 3 from opposite sides each ring covers substantially one half the circumference of the shaft, and therefore two of the rings will cover completely the circumference of the shaft and the springs 27 at the same time will act as a key to prevent the rings 20 from turning with the shaft, yet providing sufficient flexibility that each ring can follow the eccentricity of the shaft in every direction and so retain its contact therewith throughout the entire movement of the shaft.

Theoretically, therefore, the only possible point for leakage along the shaft is the exact line on either side of the shaft where the rings pass the center of the shaft, and this leakage can only occur if the rings do not reach or cover this point exactly. Further, the provision of the other two spring pressed rings 20, being arranged so that their springs 27 act in directions substantially at right angles to the first mentioned pair of springs, effectively opposes the very small leakage referred to.

The faces of all of the rings 20 are plane and adapted to fit closely to each other, being pressed together by means of the spring 32. The spring 32 is, however, relatively light so that the pressure of one ring against the other is not sufficient to prevent the springs 27 from forcing the rings 20 to follow the eccentricity of the shaft 3. This lateral movement of each of the rings 20 relative to the other occasions a rubbing movement of one ring on the other. Not only does this movement tend to keep the contiguous surfaces of the rings 20 smooth and close together so that there is substantially no leakage radially outward between adjacent rings, but also this rubbing movement, together with the wear of the shaft engaging portion of the rings 20, releases material in the form of minute particles or dust which tends to fill the clearance on the free side of the shaft.

For example, consider that the shaft 3 is rotating in the direction of the arrow in Figure 3. The loose material worn from the shaft engaging portion, as well as the loose material filtering in from the mutually contacting surfaces of the rings, will be carried by the rotation of the shaft around to the lower side of the shaft where the surface of the shaft approaches the solid part of the ring and will be crowded and packed between the shaft and ring so that an effective liquid tight engagement is built up over more than 180° of the circumference of the shaft. The material thus packed is indicated in Figure 3 by the reference numeral 50 and the extent of contact of the ring and shaft by the reference numeral 51, it being understood, however, that this representation is merely diagrammatic since as the ring is continued in use a greater and greater angle of contact between the shaft and ring is secured. The material worn from the ring in the form of minute particles or dust is of a soft and flocculent nature and tends to occupy a space greater than when initially a part of the original ring. Since each ring thus builds up a contacting area over more than 180° of the circumference a surprisingly good seal can be made with only two rings or elements 20. In some cases one ring may be built up in this manner to afford substantially 360° contact.

In the case of a reciprocating shaft material from one ring is deposited in the next adjacent ring as the member moves back and forth, so that in this case, like that of the rotating shaft, the contact of the bearing elements with the reciprocating shaft is increased in use. This same action also takes place in the case of the rotating shaft.

In this manner my novel packing structure is more or less self-healing under wear.

Under normal conditions, the strength of the springs 27 is sufficient to resist any tendency of the rings 20 to turn with the shaft 3, the pressure of the spring 32 acting longitudinally of the shaft to press all of the rings 20 toward the stationary ring 21 also aiding to secure this result.

It was pointed out above that the packing ring 21 is held rigid with the sleeve 10 and the pump housing 1. If this ring 21 fits the shaft 3 closely it will be obvious that if there is any eccentricity in the shaft 3 the ring 21 will be almost immediately worn so that there is a clearance around the shaft depending in size on the extent of the eccentricity of the shaft movement. This packing ring 21 therefore serves primarily as a steadying bearing for the shaft and reduces the clearance to a minimum. Any leakage which passes the ring 21 must pass either along the shaft as previously described or pass outwardly between the repective radial faces of the adjacent rings 20. Since these faces are held together by means of the spring 32, which only has sufficient tension to hold the rings firmly but not as much tension as the springs 27, any eccentricity of the shaft 3 will cause a relative movement of the rings 20. This may be further facilitated by giving the rings spherical surface of suitably large radius convex toward the ring 21 to permit greater swing of the rings 20 remote from the ring 21. Or if the center of movement is about shaft 4 the convexity of such surfaces faces the other way.

Consequently, if the eccentricity of the shaft 3 originates and centers somewhere around the shaft 4 which is supported by journals (not shown) it will be seen that the rings 20 while following the shaft 3 will have a decreasing eccentricity and there will actually be a relative movement between the individual lateral faces of the rings 20. The maximum movement will be between the contiguous faces of the ring 21 and the ring 20 adjacent thereto, and this is beneficial since it is at this point that there is the maximum chance for leakage. While the movement between the ring 21 and the adjacent ring 20, as well as between the rings 20, will be small, it is under normal conditions adequate to keep the faces of these rings properly seated and prevent leakage radially outward.

The outer or reduced end of the sleeve 10 is provided with a pair of plugs 35 and 36 which allow for such connections as may be necessary to supply lubricating oil to the interior of the packing gland. When so supplied with oil the entire gland assembly runs in an oil bath which keeps all parts lubricated and in good condition. There will naturally be some circulation of the oil between the parts of the gland assembly, and this circulation aids in distributing the minute particles or dust released from the rings 20 and 21, as referred to above.

Packing 17 is compressed between the packing follower 15 the metal packing ring 16 and the shaft 3, and this packing aids in retaining the oil within the sleeve 10.

I have mentioned above that ordinarily the springs 27 are sufficient to keep the rings 20 from rotating with the shaft 3. Under some conditions, however, it may be necessary or desirable to provide more positive means for preventing such rotation. In Figure 3 I have shown springs 41, which correspond to the springs 27 in Figure 1, seated in a recessed plug 42, which plug is to take the place of the short screw 30. The tip of each of the recessed plugs 42 is adapted to extend within the bore or recess 28 formed in each of the rings 20. If desirable, each of the short screws 30 may be formed with a projecting pin adapted to pass through the spring 27 and into a small hole or bore formed in the bottom of the recess 28. Either of these means, or anything equivalent thereto, may be employed to positively prevent any rotation of the rings 20.

While I have described, in connection with the accompanying drawing, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. A sealing gland for shafts and the like, comprising a plurality of packing rings substantially fitting the shaft, a sleeve surrounding said packing rings, resilient means acting between said sleeve and the rings for pressing each of said rings against the shaft, each of said rings having a recess to receive a portion of said resilient means, and means carried by said sleeve, enclosing the resilient means and extending into said recesses to prevent said rings from turning with the shaft.

2. A sealing gland for shafts and the like comprising a sleeve, a carbon ring secured to said sleeve at one end thereof, a series of carbon rings having contiguous faces in contact with one another, a spring for resiliently pressing said series of rings toward and in contact with said fixed carbon ring, spring means associated with each ring of the series for pressing the same toward the shaft from a single direction, said spring means for each ring acting in a direction different from that of all of the other rings, packing means at the other end of said sleeve and adapted to engage the shaft, and means for supplying lubricating fluid to said sleeve and rings.

3. A carbon seal gland unit adapted to seal the space between a shaft and the housing through which the shaft passes, said unit comprising a sleeve adapted to be seated in the housing, a plurality of packing rings mounted within said sleeve and urged against the shaft from various directions, means within the sleeve acting to maintain the lateral faces of said rings in substantial contact, packing means at the outer end of said sleeve, means to secure the sleeve to the housing, and means to prevent said rings from turning with the shaft.

In witness whereof, I hereunto subscribe my name this 20th day of February, 1930.

HARRY E. LA BOUR.